United States Patent [19]

Sjolin

[11] 4,310,649

[45] Jan. 12, 1982

[54] PROCESS FOR PRODUCTION OF VINYL CHLORIDE POLYMER USING ALCOHOLS

[75] Inventor: Karen Sjolin, Sundsvall, Sweden

[73] Assignee: KemaNord AB, Stockholm, Sweden

[21] Appl. No.: 871,896

[22] Filed: Jan. 23, 1978

Related U.S. Application Data

[63] Continuation of Ser. No. 701,715, Jul. 1, 1976, abandoned.

[30] Foreign Application Priority Data

Jan. 7, 1975 [SE] Sweden .............................. 7507570

[51] Int. Cl.$^3$ .............................................. C08F 2/24
[52] U.S. Cl. .................................. 526/212; 526/204; 526/216; 526/225
[58] Field of Search ................ 526/212, 225, 204, 216

[56] References Cited

U.S. PATENT DOCUMENTS

| | | | |
|---|---|---|---|
| 2,531,196 | 11/1950 | Brubaker | 526/212 |
| 2,643,995 | 6/1953 | Park | 526/212 |
| 3,324,097 | 6/1967 | Pears | 526/207 |
| 3,383,346 | 5/1968 | Smith | 526/209 |
| 3,551,399 | 12/1970 | Yonezu | 526/218 |
| 4,029,619 | 6/1977 | Tajima | 526/74 |
| 4,071,675 | 1/1978 | Yu | 526/193 |

FOREIGN PATENT DOCUMENTS

| | | | |
|---|---|---|---|
| 2260957 | 6/1973 | Fed. Rep. of Germany | 526/212 |
| 30-555995 | 8/1955 | Japan | 526/212 |
| 1262970 | 2/1972 | United Kingdom | 526/212 |
| 1373308 | 11/1974 | United Kingdom | 526/212 |

OTHER PUBLICATIONS

Sarvetnick, H. A., Polyvinylchloride, Reinhold (N.Y.), 1969, pp. 43, 44, 45.

*Primary Examiner*—C. A. Henderson
*Attorney, Agent, or Firm*—Fred Philpitt

[57] ABSTRACT

The present invention relates to a method for the production of vinyl chloride polymerizates by emulsion polymerization. The obtained polymerizate is suitable for the production of plastisols having very low viscosity.

8 Claims, No Drawings

PROCESS FOR PRODUCTION OF VINYL CHLORIDE POLYMER USING ALCOHOLS

This is a continuation of application Ser. No. 701,715, filed July 1, 1976 now abandoned.

BACKGROUND

Vinyl chloride polymerizates prepared by emulsion polymerization are mainly used for the preparation of plastisols, i.e. dispersions of the polymerizate in plasticizers. These plastisols or pastes are widely used in moulding processes, e.g. slush moulding, rotational casting, in coating processes, e.g. dipping, spread coating, or for the production of cellular products. The desired products are obtained by gelation of the plastisol, which can also contain stabilizers, fillers, pigments, etc., through heating.

The stability of these plastisols is to a great extent dependent on the average particle size and the particle size distribution of the polymerizate. It is essential that the plastisol have a low initial viscosity and only a slow In the emulsion polymerization the monomer or the mixture of monomers is dispersed in water to a droplet size within the range of 10 to 30 μm by means of an emulsifier and the polymerization is carried out with water soluble initiators. The initiator decomposes at the polymerization temperature forming water-soluble radicals. These react with a monomer molecule dissolved in the aqueous phase and radicals of oligomers are formed. At a certain chain length the growing polymer chain is precipitated and particles, which are stabilized by a water-soluble emulsifier, are formed. After this initiation phase the polymerization proceeds in the monomer swelled particles. If the emulsifier content of the aqueous phase is above the critical micelle concentration the initiation can on the other hand occur in monomer-containing micelles. Hereby are formed polymer particles in which the polymerization then proceeds. The obtained polymerizate is in the form of latex and is isolated by breaking the latex or by evaporation in a spray drier or on a roll drier.

Vinyl chloride polymerizates prepared according to this process generally have a relatively narrow particle size distribution and the primary particles have a very low diameter with the result that plastisols produced from these polymerizates show a very high viscosity and their application fields are thus very much restricted. In order to obtain plastisols having suitable viscosity properties and ageing properties it is often necessary to mix polymerizates of different particle sizes. Another method which has been technically applied is to carry out the emulsion polymerization in the presence of a seed latex whereby a broader particle size range, and thereby a lower viscosity of the paste is obtained.

THE PRESENT INVENTION

According to the present invention it has been found that it is possible to produce a vinyl chloride polymerizate having a comparatively large particle size and broad particle size distribution using the emulsion polymerization technique. These polymerizates result in pastes or plastisols having low initial viscosity and low viscosity even after storage. This is achieved by using a particular dispersion process in combination with the utilization of water-soluble organic initiators.

It is characteristic of the present process that the dispersing of the monomer or the mixture of monomers is carried out in a predispersion of water, at least one water soluble emulsifier and at least one aliphatic alcohol having 14 to 24 carbon atoms, said predispersion being obtained by mixing the components at a temperature at or above the melting point of the alcohol, whereafter the polymerization is carried out by utilization of water-soluble organic initiator. The polymerization is carried out in a known manner with agitation of the obtained monomer-waterdispersion at an elevated temperature and an elevated pressure.

The predispersion of water, emulsifier and alcohol can be prepared in any suitable manner, preferably in the polymerization autoclave. The obtained predispersion is stable even at temperatures below the melting point of the alcohol and preparation thereof outside the polymerization autoclave is thus possible. The order of charging is arbitrary and the alcohol can thus be added to a warmed mixture of water and emulsifier or the emulsifier can be added to a warmed mixture of water and alcohol. No unusually high speed of agitation for the preparation of the predispersion is required, but moderate agitation can be used, e.g. the speed normally used at the polymerization of vinyl chloride.

It is essential that the temperature during the preparation of the predispersion be kept at or above the melting point of the vinyl chloride or the monomer-mixture. In order to facilitate the dispersion process the alcohol is preferably added to the warmed water in melted form. It is likewise essential that substantially all the alcohol has been dispersed in the aqueous phase before charging the monomer or the mixture of monomers, this in order to avoid dissolution of the alcohol in the monomer. In that case a vinyl chloride polymerizate having the desired properties is not obtained.

The alcohol used at the prearation of the predispersion is an aliphatic alcohol having 14 to 24 carbon atoms, preferably 16 to 20 carbon atoms. The aliphatic group can be straight or branched and optionally can contain inert substituents which do not inerfere with the polymerization. The melting point of the alcohol should be within the range of 40° to 90° C., preferably 45° to 70° C. As examples of suitable alcohols can be mentioned myristyl alcohol, cetyl alcohol, stearyl alcohol and dodecanol. The amount of alcohol should be within the range of 0.2 to 2 percent by weight, preferably 0.4 to 1.5 percent by weight, based on the monomer or monomer mixture.

According to the present invention it has surprisingly been found that initiation of the polymerization must occur by means of water-soluble organic initiators. Utilization of inorganic initiators results in polymerizates which during the production of pastes give unacceptably high viscosities. As examples of water-soluble organic initiators can be mentioned hydroperoxides, such as methyl ethyl ketone peroxide, 1-hydroxy-1-hydroperoxy-di-cyclohexyl peroxide, cumene hydroperoxide, tert.-butyl hydroperoxide, peroxides such as tert.-butyl cumyl peroxide and water-soluble azo compounds. Preferably the hydroperoxides are used. In the present application hydrogen peroxide is also considered as an organic hydroperoxide. The amount of initiator should be within the range of 0.01 to 0.5 percent by weight, preferably 0.03 to 0.2 percent by weight, based on the monomer or the monomer-mixture. The pH of the polymerization medium is adjusted in a known manner in order to obtain water solubility of the initiator.

Any known emulsifier for the emulsion polymerization of vinyl chloride can be used in the present process. As examples of suitable water-soluble emulsifiers can be mentioned: alkylpyridinum salts, quarternary ammonium compounds, alkali or ammonium salts of alkyl-sulfate, alkylsulfonate, alkylethersulfate, alkylarylsulfonate, fatty acids etc. The alkyl part of these compounds should have a carbon chain, preferably straight, containing more than 10 carbon atoms, preferably 12 to 22 carbon atoms. The amount of emulsifier should be within the range of 0.3 to 2 percent by weight, preferably 0.5 to 1.5 percent by weight, based on the monomer or the monomer mixture.

As examples of ethylenically unsaturated compounds suitable for copolymerization with vinyl chloride can be mentioned: alkenes, vinyl acetate, vinylidene chloride, acrylic and methacrylic acids or their esters and nitriles, vinyl esters and maleic or fumaric acid, as well as their esters and anhydrides.

Polymerization is carried out according to known techniques for the emulsion polymerization of vinyl chloride and optional comonomers at temperatures within the range of 40° to 70° C. preferably 35° to 60° C. and at a pressure corresponding to the saturation pressure of the vinyl chloride or the monomer mixture. The polymerization can, if desired, be carried out in the presence of a seed-latex, which in that case is added after the preparation of the predispersion.

After polymerization to the desired degree of conversion the polymerizate can be isolated in any suitable manner, e.g. by breaking the latex or by evaporating in a spray drier on a roll drier.

The invention is further illustrated by the following examples which, however, are not intended to limit the scope of the invention. In the examples percent and parts relate to percent by weight and parts by weight respectively, unless otherwise stated.

EXAMPLE 1 (COMPARATIVE EXAMPLE)

In a 14 l. autoclave provided with anchor agitator vinyl chloride was polymerized in water emulsion according to the following receipe:
vinyl chloride: 100 parts
distilled water: 197 parts
sodium lauryl sulfate: 1 part
cetyl alcohol: 1.1 parts
potassium persulfate: 0.25 parts Water and sodium lauryl sulfate were agitated at 180 rpm at a temperature of 53° C. Melted cetyl alcohol was added to the system and after 15 minutes of agitation the system was evacuated and vinyl chloride charged. The temperature was lowered to 50° C. whereafter potassium persulfate (dissolved in water) was added and the polymerization started. After 7 hours the pressure in the autoclave had fallen to 0.6 MPa and unreacted vinyl chloride was then blown off.

The obtained latex had a primary particle size substantially within the range of 0.5 to 1 μm.

The latex was dried in a laboratory spray drier equipped with a wheel rotating at a high speed.

100 parts of the polymerizate were mixed with 60 parts of dioctyl phthalate and 2 parts of Irgastab BC 206 (A Ba/Cd-stabilizer). After 24 hours the viscosity of the paste was measured according to Brookfield. The obtained paste viscosity was 120 Pas. (Spindle 6, 10 rpm).

EXAMPLE 2

Vinyl chloride was polymerized in water emulsion according to the following receipe:
vinyl chloride: 100 parts
distilled water: 150 parts
sodium lauryl sulfate: 1.2 parts
cetyl alcohol: 1.1 parts
methyl ethyl ketone hydroperoxide (MEKP): 0.041 parts Water and 0.5 parts of sodium lauryl sulfate were agitated at 180 rpm at 53° C. Ammonia was added to adjust the pH of the system to about 9. Melted cetyl alcohol was added and after 15 minutes of agitation the system was evacuated and 75 parts of vinyl chloride were charged. The temperature was lowered to 50° C. and MEKP (0.021 parts) dissolved in methanol (0.04 g/ml) was then added. After a polymerization time of 3 hours an additional 0.020 parts of MEKP were added. When the pressure had fallen to 0.7 MPa 0.7 parts of sodium lauryl sulfate and 25 parts of vinyl chloride were added. After a polymerization time of 6 hours the pressure in the autoclave had fallen to 0.6 MPa and unreacted vinyl chloride was then blown off.

The obtained latex had a primary particle size substantially within the range of 0.5 to 1.2 μm.

A paste was prepared in the same manner as in example 1. The paste viscosity according to Brookfield (after 24 hours) was 13 Pas.

EXAMPLE 3

Example 3 was carried out according to Example 2 with the exception that 55 parts of vinyl chloride were charged in the first step. The obtained latex had a primary particle size substantially within the range of 0.4 to 0.9 μm and the paste viscosity was 24 Pas.

EXAMPLE 4

Vinyl chloride was polymerized in water emulsion according to the following recipe:
vinyl chloride: 100 parts
distilled water: 160 parts
ammonium stearate: 1 part
cetyl alcohol: 1.1 parts
1-hydroxy-1-hydroperoxy-di-cyclohexyl peroxide (CHP): 0.041 parts The process of Example 3 was repeated but with utilization of CHP as initiator and ammonium stearate as emulsifier whereby 0.66 parts of ammonium stearate were charged at the start of the polymerization. The primary particle size of the latex was 0.5 to 1.5 μm and the paste viscosity was 22 Pas.

EXAMPLE 5

Vinyl chloride was polymerized in water emulsion according to the following receipe:
vinyl chloride: 100 parts
distilled water: 190 parts
ammonium laurate: 0.9 parts
cetyl alcohol: 1.0 part
CHP: 0.06 parts The pH of the system was adjusted to 9 with ammonia and otherwise the process of Example 1 was followed with the exception of the emulsifier and the initiator system.

The initiator was added in two batches: 0.04 parts at the start of the polymerization and 0.02 parts after a polymerization time or 3 hours. The primary particle size of the latex was substantially within the range of 0.5 to 1.3 μm.

The obtained paste viscosity was 16 Pas.

EXAMPLE 6

Example 6 was carried out in accordance with Example 5 except that 1.5 parts of cetyl alcohol were added. The primary particle size of the latex was substantially within the range of 0.5 to 1.3 μm.

The obtained paste viscosity was 11 Pas.

EXAMPLE 7

Vinyl chloride was polymerized in water emulsion according to the following receipe:
vinyl chloride: 100 parts
distilled water: 190 parts
sodium laurylethersulfate: 0.9 parts
cetyl alcohol: 0.55 parts
MEKP: 0.06 parts Example 7 was carried out in accordance with Example 5 but sodium laurylethersulfate was used instead of ammonium laurate, MEKP instead of CHP and the amount of cetyl alcohol was reduced to 0.55 parts. The primary particle size of the latex was 0.5 to 0.9 μm.

The obtained paste viscosity was 10 Pas.

EXAMPLE 8

Example 8 was carried out in accordance with Example 7 but the amount of cetyl alcohol was increased to 1.1 parts. The primary particle size of the latex was between 0.5 and 0.9 μm.

The obtained paste viscosity was 10 Pas.

EXAMPLE 9

Vinyl chloride was polymerized in water emulsion according to the following receipe:
vinyl chloride: 100 parts
distilled water: 190 parts
sodium pentadecysulfonate: 0.8 parts
cetyl alcohol: 1.0 part
CHP: 0.06 parts The process of Example 8 was repeated but sodium alkylsulfonate was used instead of ammonium laurate and the amount of cetyl alcohol was reduced to 1.0 part. The primary particle size of the latex was substantially between 0.2 and 1.0 μm.

The obtained paste viscosity was 20 Pas.

What is claimed is:

1. In the known emulsion polymerization process for the preparation of vinyl chloride polymers, suitable for the production of plastisols, by heating a water dispersion of vinyl chloride and 0–20 percent of at least one other ethylenically unsaturated copolymerizable monomer in the presence of a water-soluble initiator, wherein the improvement which comprises:
    (a) that said monomer or monomers are added to a pre-dispersion of said water, emulsifier and alcohol which have been prepared by mixing the components at a temperature at or above the melting point of said alcohol, and
    (b) that said polymerization is carried out by using a water-soluble organic initiator.
2. The method which comprises:
    (a) forming a predispersion of
        (1) water,
        (2) at least one water-soluble emulsifier, and
        (3) at least one aliphatic alcohol containing between 14 and 24 carbon atoms,
        said predispersion being obtained by mixing the above components (1), (2) and (3) at a temperature at or above the melting point of said alcohol,
    (b) admixing said predispersion with
        (1) vinyl chloride monomer,
        (2) 0–20% by weight of at least one other ethyleneically unsaturated copolymerizable monomer, and
        (3) at least one water-soluble organic polymerization initiator,
    (c) carrying out emulsion polymerization according to the known emulsion techniques, and
    (d) recovering a polymerizate suitable for the production of plastisols.
3. A method according to claim 2 wherein said other copolymerizable polymer is selected from the group consisting of vinyl acetate, vinylidene chloride, acrylic and methacrylic acids and their esters and nitriles, vinyl esters, and malic or furamic acid as well as their esters and their anhydrides.
4. A method according to claim 2 wherein the only monomer is vinyl chloride monomer.
5. A method according to claim 4 wherein said water-soluble organic polymerization initiator is selected from the group consisting of hydrogen peroxide, methyl ethyl ketone peroxide, 1-hydroxy-1-hydroperoxy-dicyclohexylperoxide, cumene hydroperoxide, tertiary-butylhydroperoxides and water-soluble azo compounds.
6. A method according to claim 4 wherein said polymerization initiator is 1-hydroxy-1-hydroperoxy-dicyclohexylperoxide.
7. A method according to claim 4 wherein said polymerization initiator is 1-hydroxy-1-hydroperoxy-dicyclohexylperoxide.
8. A method according to claim 4 wherein said emulsifier is selected from the group consisting of alkyl pyridinium salts, quaternary ammonium compounds, alkali or ammonium salts of alkyl sufates, alkyl sufonates, alkyl ether sufates, alkyl aryl sulfonates, and fatty acids.

* * * * *